UNITED STATES PATENT OFFICE.

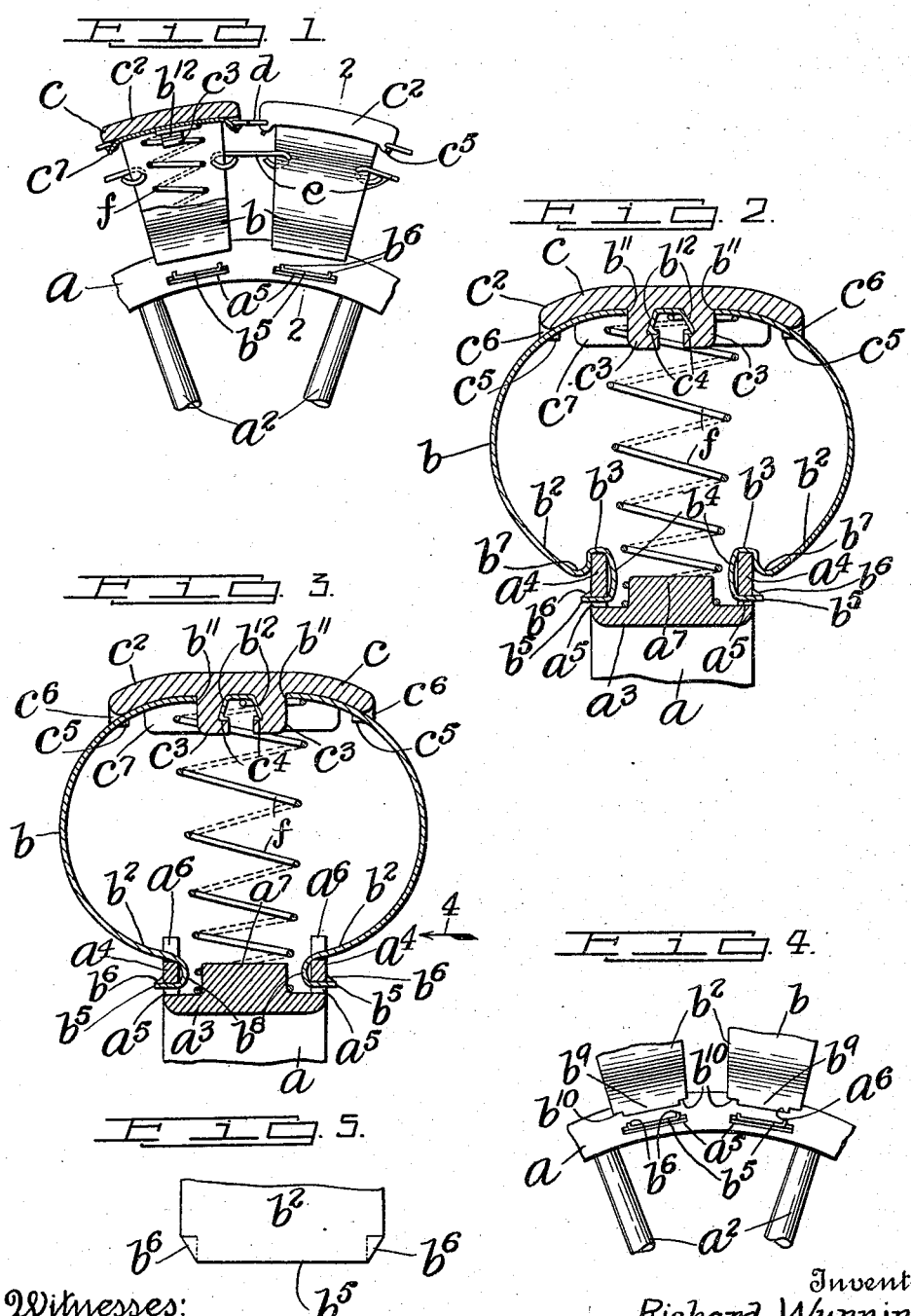

RICHARD WUNNING, OF NEW YORK, N. Y.

WHEEL RIM AND TIRE.

1,185,861.      Specification of Letters Patent.      Patented June 6, 1916.

Application filed December 3, 1915. Serial No. 64,838.

*To all whom it may concern:*

Be it known that I, RICHARD WUNNING, a citizen of the United States, and residing at New York, in the county of New York and State of New York, have invented certain new and useful Improvements in Wheel Rims and Tires, of which the following is a specification, such as will enable those skilled in the art to which it appertains to make and use the same.

This invention relates to vehicle wheel rim and tire constructions, and the object thereof is to provide a construction of this class which will obviate the necessity of using rubber or similar tires and shoes on automobile and other vehicles, and which may be easily repaired when necessary and which will also be comparatively inexpensive; and with this and other objects in view the invention consists in a wheel rim and tire constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a sectional side view of a part of a wheel rim and tire construction made according to my invention; Fig. 2 a transverse or radial section on the line 2—2 of Fig. 1; Fig. 3 a view similar to Fig. 2 but showing a modification; Fig. 4 a side view looking in the direction of the arrow 4 of Fig. 3; and, Fig. 5 a side view of one side portion of a sheet metal strip which I employ in the construction shown in Figs. 1 and 4, and from which spring loop or bow members are made which constitute a part of my improved wheel rim and tire construction.

In the practice of my invention, I provide a wheel comprising a rim portion $a$ and spokes $a^2$ which connect with the rim, and with the hub which is not shown, but the hub and spokes form no part of my invention. The rim $a$ is U-shaped in form in cross section and comprises an annular member $a^3$ and outwardly directed annular side flanges $a^4$, and, in connection therewith, I employ a tire construction involving a tread portion, and spring loop or bow members $b$ arranged radially and transversely of the rim and composed of sheet metal strips, and open at the inner side, and which may be connected with the rim $a$ either as shown in Figs. 1 and 2, or in Figs. 3 and 4.

The side flanges $a^4$ of the rim, in the construction shown in Figs. 1 and 2, are provided closely adjacent to the annular rim member $a^3$ with circumferential slots $a^5$, and the end portions $b^2$ of the spring loop or bow members are formed into outwardly directed loop portions $b^3$ having inwardly curved spring arm members $b^4$ provided with outwardly directed extensions $b^5$ adapted to be passed outwardly through the slots $a^5$, and the corner edge portions of the outwardly directed extensions $b^5$ of the spring arm members $b^4$ are provided with outwardly directed triangular lugs $b^6$ which are cut from the material of the parts $b^5$, as indicated in Fig. 5, which figure shows one end of the steel blank from which the loop or bow members $b$ are formed.

The slots $a^5$ are of sufficient radial depth to permit the parts $b^5$ with the lugs $b^6$ to be passed outwardly therethrough in the operation of connecting the loop or bow members with the rim of the wheel, and the parts $b^2$, $b^4$ and $b^5$ form combination, resilient and spring clamping and attaching devices for connecting the loop or bow members $b$ within said rim, and in the formation of the outwardly directed loop members $b^3$ of said spring clamping and attaching devices, the side portions of the loop or bow members are provided with inwardly directed and approximately arc-shaped curves or elbows $b^7$ which bear on the outer side of the flanges $a^4$ of the rim $a^3$ when said loop or bow members are in position.

In the construction shown in Figs. 3 and 4, the flanges $a^4$ of the rim are provided in the outer edges thereof with circumferentially arranged recesses $a^6$ which correspond with the slots $a^5$, and the ends of the side portions of the spring loop or bow members are provided with U-shaped loops $b^8$ which take the place of the combination resilient and spring clamping and attaching devices formed by the parts $b^3$, $b^4$ and $b^5$ in Figs. 1 and 2, and said U-shaped loops are provided with the outwardly directed extensions $b^5$ the same as in Figs. 1 and 2. In this form of construction, the end parts of the side portions $b^2$ of the loop or bow members $b$ are cut out at their opposite side edges to form tongues $b^9$ from which the loops $b^8$ and parts $b^5$ are formed, and at the opposite side edges of the tongues $b^9$ the side parts $b^2$ of the loop or bow members $b$ are provided with shoulders $b^{10}$ which bear on the outer side walls of the flanges $a^4$ of the rim, and the tongues $b^9$ fit in the recesses $a^6$ in the flanges $a^4$, and the parts $b^8$ and $b^9$ with the lugs $b^6$ form combination resilient and spring clamping and attaching devices for connecting the loop or bow members $b$ with the rim of the wheel.

The tread or tire portion proper is shown at $c$ and consists of separate blocks $c^2$ which are placed on the outer or tread portions of the spring loop or bow members $b$, and which may be composed of any suitable material and which are connected circumferentially by links or similar devices $d$.

The loop or bow members $b$ are provided centrally of their outer or tread portions with apertures $b^{11}$ having inwardly directed and outwardly directed diverging tongues or prongs $b^{12}$, and the blocks $c^2$ are provided with inwardly directed lugs or projections $c^3$ which pass through the apertures $b^{11}$ and are provided at their inner sides with recesses $c^4$ which receive the tongues or prongs $b^{12}$ when the lugs or projections $c^6$ are forced inwardly in the operation of connecting the tire or tread blocks $c^2$ with the loop or bow members $b$.

The tread blocks $c^2$ are slightly concave on their inner surfaces and are provided on their adjacent ends with inwardly directed flanges $c^5$ having transverse recesses $c^6$ in which the spring loop or bow members $b$ fit, and this construction securely binds the tread blocks $c^2$ to said spring loop or bow members, and said loop or bow members are preferably provided at their adjacent outer edges with inwardly directed flanges $c^7$.

The spring loop or bow members $b$ are also connected inwardly of the tread surface thereof by side links or similar devices $e$, and placed in said loop or bow members are spiral springs $f$ which are radially arranged, and the inner ends of which fit around corresponding lugs or projections $a^7$ on the rim $a$, while the outer ends thereof encircle the lugs or projections $c^3$ on the tire blocks $c^2$ and bear on the inner surfaces of the outer parts of the loop or bow members $b$.

The tread member $c$, or the blocks $c^2$ thereof, the means for connecting said blocks with the loop or bow members $b$ and the springs $f$ form no part of the invention described herein but are fully described and claimed in a prior application filed by me Feb. 1, 1915, Serial No. 5,347.

By means of my improvement, I provide a tire which will possess all the elastic or spring qualities of pneumatic tires and other spring or elastic tires of this class, and which may be used wherever such tires are required, and which may be easily repaired at any time if the separate parts thereof should be broken or injured.

The triangular lugs $b^6$ at the ends of the outwardly directed extensions $b^5$ facilitate the passing of said extensions through the slots $a^5$ in the flanges $a^4$ of the rim of the wheel, and said lugs prevent the withdrawal inwardly of said extensions $b^5$ from the flanges $a^4$ in the operation of the wheel, or when pressure is applied to the outer or tread portions of the loop or bow members $b$, and in this way the combination resilient and spring clamping and attaching devices composed of the parts $b^3$, $b^4$ and $b^5$, in the construction shown in Figs. 1 and 2, and the parts $b^8$ and $b^5$ in the construction shown in Figs. 3 and 4, securely lock the loop or bow members $b$ to the rim of the wheel and hold said loop or bow members in proper position when the wheel is in use, and this operation of said parts in facilitated by the outwardly directed loop members $b^3$ shown in Figs. 1 and 2, and the recesses $a^6$ in the flanges $a^4$ of the rim, and the tongues $b^9$ of the loop or bow members and the shoulders $b^{10}$ of said loop or bow members in the construction shown in Figs. 3 and 4.

Although I have shown and described the construction which I prefer, my invention, as will be understood, is not limited to the details of construction herein set out, and various changes therein and modifications thereof may be made, within the scope of the appended claims, without departing from the spirit of my invention or sacrificing its advantages.

Having fully described my invention, what I claim as new and desire to secure by Letters Patent, is:—

1. In a wheel rim and tire construction, a rim having outwardly directed annular side flanges provided adjacent to the rim with circumferentially arranged slot openings, and transversely arranged spring loop or bow members open at their inner sides and provided at their ends with spring clamping and attaching devices having outwardly directed extensions adapted to be passed outwardly through said slot openings and provided with integral means for preventing their backward or inward movement through said slot openings.

2. In a wheel rim and tire construction, a rim having outwardly directed annular side flanges provided adjacent to the rim with circumferentially arranged slot openings, and transversely arranged spring loop or bow members open at their inner sides and provided at their ends with loop-shaped spring clamping and attaching devices having outwardly directed extensions adapted to be passed outwardly through said slot openings and provided at their ends with means for preventing the inward or backward movement thereof through said slot openings.

3. In a wheel rim and tire construction, a rim having outwardly directed annular side flanges provided adjacent to the rim with circumferentially arranged slot openings and transversely arranged spring loop or bow members open at their inner sides and provided at their ends with loop-shaped spring clamping and attaching devices having outwardly directed extensions adapted to be passed outwardly through said slot openings and provided at their ends with means for preventing the inward or backward movement thereof through said slot openings, and means whereby said loop-shaped spring clamping and attaching devices will be held in connection with the outer edge portions of said flanges.

4. In a wheel rim and tire construction, a rim having outwardly directed annular side flanges provided adjacent to the rim with circumferentially arranged openings, and transversely arranged spring loop or bow members open at their inner sides and provided at their ends with spring clamping and attaching loop members adapted to engage the outer edges of said flanges and having parts adapted to be passed outwardly through said openings.

In testimony that I claim the foregoing as my invention I have signed my name in presence of the subscribing witnesses this 30th day of November 1915.

RICHARD WUNNING.

Witnesses:
C. MULREANY,
H. E. THOMPSON.

Copies of this patent may be obtained for five cents each, by addressing the "Commissioner of Patents, Washington, D. C."